(12) United States Patent
Bhatia et al.

(10) Patent No.: US 6,351,588 B1
(45) Date of Patent: Feb. 26, 2002

(54) FIBER BRAGG GRATING WITH CLADDING MODE SUPPRESSION

(76) Inventors: Vikram Bhatia, 30 Pond Crest, Painted Post, NY (US) 14870; Adam K. Collier, 507 Gaines St., Elmira, NY (US) 14904; Liang Dong, 8 Timber La., Painted Post, NY (US) 14870; Marlene A. Marro, 6354 Rte. 226, Savona, NY (US) 14879; Gang Qi, 21 Dreams So., Painted Post, NY (US) 14870; Martin R. Swan, 149 Reynolds Ave., Corning, NY (US) 14830; David Lee Weidman, 502 N. Pine St., Horseheads, NY (US) 14845

( * ) Notice: Subject to any disclaimer, the term of this patent is extended or adjusted under 35 U.S.C. 154(b) by 0 days.

(21) Appl. No.: 09/398,657

(22) Filed: Sep. 17, 1999

(51) Int. Cl.[7] .................................................. G02B 6/02
(52) U.S. Cl. ........................ 385/123; 385/127; 385/142; 385/144; 385/37
(58) Field of Search ............................ 385/10, 12, 14, 385/37, 24, 27, 43, 124, 127, 131, 123, 142, 126, 144

(56) References Cited

U.S. PATENT DOCUMENTS

| | | | |
|---|---|---|---|
| 5,852,690 A | | 12/1998 | Haggans et al. ............... 385/37 |
| 5,883,990 A | * | 3/1999 | Sasaoka et al. ................ 385/37 |
| 6,005,999 A | * | 12/1999 | Singh et al. .................... 385/37 |
| 6,009,222 A | * | 12/1999 | Dong et al. ................... 385/127 |
| 6,091,870 A | * | 7/2000 | Eldada .......................... 385/37 |
| 6,111,999 A | * | 8/2000 | Espindola et al. ............. 385/37 |

FOREIGN PATENT DOCUMENTS

| | | | | |
|---|---|---|---|---|
| JP | 56-101108 | * | 8/1981 | ................ 385/127 |
| WO | WO96/34304 | | 10/1996 | |
| WO | WO97/26571 | | 7/1997 | |
| WO | WO 99/41627 | | 8/1999 | |

OTHER PUBLICATIONS

Delevaque et al. "Optical Fiber Design For Strong Gratings Photoimprinting with Radiation Mode Suppression", OFC '97, PD5–1—PD5–4.

Haggans, et al., "Narrow–Depressed Cladding Fiber Design for Minimization of Cladding Mode Losses in Azimuthally Asymmetric Fiber Bragg Gratings", IEEE, vol. 16, No. 5, May 1998, pp. 902–909.

Oh et al., "Suppression of cladding mode coupling in Bragg grating using $Ge_2O$–$B_2O_3$ codoped photosensitive cladding optical fibre", Electronics Letters, Mar. 4, 1999, Vo. 35, No. 5.

Williams et al., "Enhanced UV Photosensitvity in Boron Codoped Germanosilicate Fibres", Electronics Letters, Jan. 7, 1993, vol. 29, No. 1, pp. 45–47.

Dong et al., "Cladding mode coupling supression in fibre Bragg gratings using fibres with a depressed cladding", ECOC '96, Oslo, [Mon., Sep. 6] 1.53–1.56.

* cited by examiner

Primary Examiner—Loha Ben
(74) Attorney, Agent, or Firm—Mary Y. Redman

(57) ABSTRACT

An optical waveguiding fiber has a photosensitive core and a cladding that includes a photosensitive inner cladding region adjacent the core and an outer cladding region. The inner cladding region and the outer cladding region have substantially equal indices of refraction. The photosensitivity of the inner cladding region is sufficient to cause a modulation of the index of refraction of the inner cladding when exposed to ultraviolet light. In another aspect of the invention, the optical fiber includes a grating in the core, which extends radially into the inner cladding region. The core and the inner cladding region of the optical fiber are doped with concentrations of Ge and B sufficient to impart photosensitivity to the inner cladding region, and to result in an index of refraction in the inner cladding region substantially equal to the index of refraction of the outer cladding region.

11 Claims, 3 Drawing Sheets

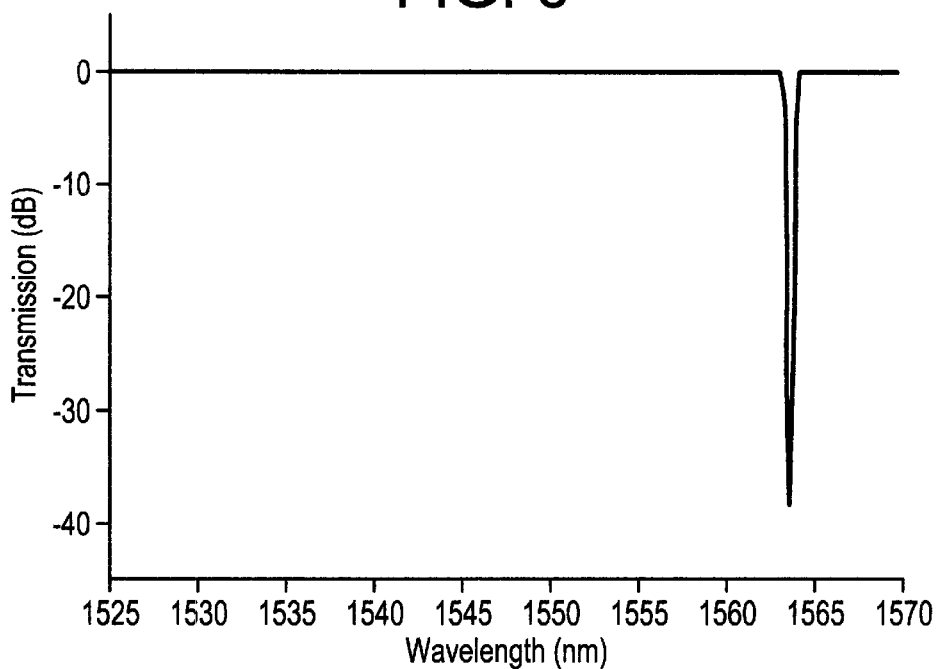
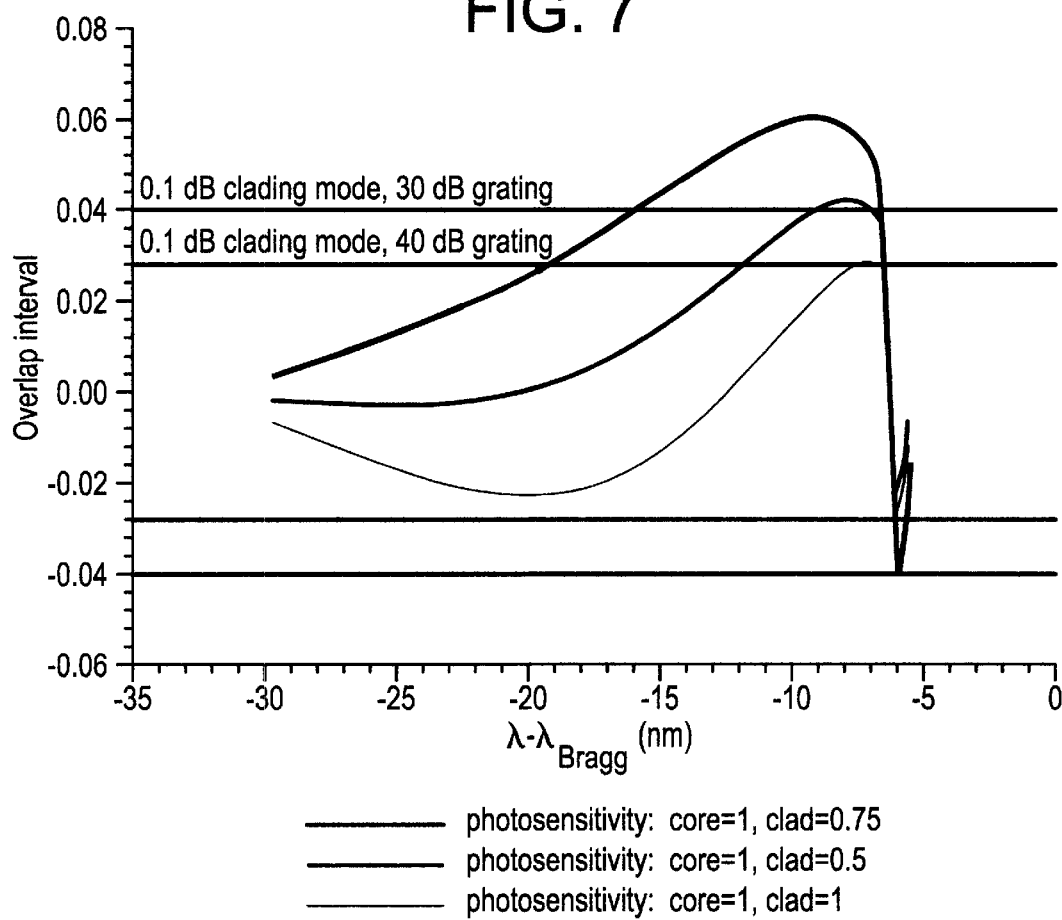

FIBER BRAGG GRATING WITH CLADDING MODE SUPPRESSION

BACKGROUND OF THE INVENTION

1. Field of the Invention

The present invention relates generally to fiber Bragg gratings, and particularly to suppression of cladding modes in optical fibers which include fiber Bragg gratings.

2. Technical Background

Fiber Bragg gratings are periodic refractive index modulations along the length of an optical waveguiding fiber. Fiber Bragg gratings have become increasingly more important in wavelength division multiplexing (WDM) systems and other applications for fiber optic systems. They have become a technology platform for implementation of a variety of devices including add/drop filters, gain flattening filters, band splitters and dispersion compensators.

Fiber Bragg gratings generally exhibit highly desirable optical characteristics, while being easily fabricated. The most common technique for fabrication of a fiber Bragg grating is to create the pattern of refractive index modulations by exposing the core to ultraviolet light in the desired pattern. The pattern may be created by interference of two ultraviolet light (UV) beams or other well-known means. The refractive index of the core is permanently altered by exposure to the ultraviolet light through the well-known photosensitive effect. This technique is commonly referred to as "writing" a grating Index modulation, which is measured as half of the peak-to-peak variation in refractive index created in the writing process, is a key characteristic of a fiber grating. Index modulation is directly related to photosensitivity of the material in which the grating is written.

A fiber Bragg grating will reflect light in a narrow band centered on the Bragg wavelength, $\lambda_{Bragg}$, determined by the equation for the phase matching condition, $$2\beta_{01}(\lambda_{Bragg}) = \frac{2\pi}{\Lambda} \quad (1)$$

where $\Lambda$ is the period of the grating, and $\beta_{01}$ is the propagation coefficient for the fundamental mode $LP_{01}$, sometimes also referred to as the core mode.

In an optical waveguiding fiber including a core, a cladding surrounding the core and an outer layer which can be air or a polymer coating, the fiber structure may support a large number of cladding modes. They may be guided modes or leaky modes, depending on whether the outer layer or fiber coating has a lower or a higher refractive index than that of the cladding. These modes are commonly designated as $LP_{nm}$ cladding modes, where nm is the mode number. At a fiber Bragg grating, light propagating in the guided fundamental mode $LP_{01}$ may couple into a cladding mode under a phase matching condition given by the following equation:

$$\beta_{01}(\lambda_{nm}) + \beta_{nm}(\lambda_{nm}) = \frac{2\pi}{\Lambda} \quad (2)$$

where $\Lambda$ is the grating's period, $\beta_{nm}$ is the propagation constant of cladding mode $LP_{nm}$ at wavelength $\lambda_{nm}$, and $\beta_{01}$ is the propagation constant of the fundamental mode $LP_{01}$ at wavelength $\lambda_{nm}$. The wavelength $\lambda_{nm}$ at which $LP_{01}$ will couple into a cladding mode if equation (2) is fulfilled, is always less than the Bragg wavelength, $\lambda_{Bragg}$, because $\beta_{nm}$ is always less than $\beta_{01}$.

Typically, a series of wavelengths will meet this condition, corresponding to a series of cladding modes. Power coupled into the cladding modes is typically lost through absorption or scattering through the fiber coating as the cladding modes propagate. Thus, as depicted in FIG. 1, coupling into cladding modes causes a series of loss peaks (designated generally by reference numeral 12) on the short wavelength side of the Bragg wavelength loss peak 14, limiting the free spectral range of the grating. As shown in FIG. 1, there is a wavelength band A—A between the Bragg wavelength peak 14 and the onset of the cladding mode peaks 12. Widening of this band A—A through cladding mode suppression would be desirable to increase the free spectral range of the grating.

One approach to achieving cladding mode suppression has been to use a fiber with a high delta of approximately 2% (where delta is the normalized refractive index difference between the core and cladding). While this provides a free spectral range on the short wavelength side of $\lambda_{Bragg}$ of as much as about 10 nm, this is still not sufficient for many applications. Another problem with this approach is unacceptably large splice loss when connecting such high delta fiber to standard fiber, such as that sold under the trademark SMF-28™ by Corning Incorporated, due to modal spot size mismatch.

What is needed is an optical waveguiding fiber which has properties which will suppress coupling into cladding modes in fiber Bragg gratings, so as to increase the free spectral range of filters which are made with fiber Bragg gratings, while not adversely affecting other optical properties of the fiber, or the grating.

SUMMARY OF THE INVENTION

One aspect of the present invention is an optical waveguiding fiber that has a photosensitive core and a cladding that includes a photosensitive inner cladding region adjacent the core and an outer cladding region. The inner cladding region and the outer cladding region have substantially equal indices of refraction. The core and inner cladding region are doped with Ge. At least one of the core and the inner cladding region is also doped with at least one additional dopant. The concentration of Ge in the core, Ge in the cladding, and the additional dopant are such that the index modulation in the inner cladding region is within 50 percent of the index modulation in the core caused by exposure to actinic radiation such as ultraviolet light.

In another aspect, the present invention includes an optical fiber with a photosensitive core and a photosensitive inner cladding region adjacent the core and an outer cladding region with substantially equal indices of refraction, where the photosensitivity of the inner cladding region is sufficient to cause a modulation of the index of refraction of the inner cladding when exposed to ultraviolet light.

In another aspect of the invention, the optical fiber includes a grating in the core, which extends radially into the inner cladding region.

In another aspect of the invention, the core and the inner cladding region of the optical fiber are doped with concentrations of said Ge and B dopants and are sufficient to impart photosensitivity to the inner cladding region, and to result in an index of refraction in the inner cladding region substantially equal to the index of refraction of the outer cladding region, or within a range of from −0.003 to 0.001 for index of refraction of inner cladding region minus that of the remainder of the cladding.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description are merely exemplary of the invention, and are intended to provide an overview or framework for understanding the nature and character of the invention as it is claimed. The accompanying drawings are included to provide a further understanding of the invention, and are incorporated in and constitute a part of this specification. The drawings illustrate various embodiments of the invention, and together with the description serve to explain the principles and operation of the invention.

BRIEF DESCRIPTION OF THE DRAWINGS

FIG. 6 is a graph of transmission vs. wavelength for a fiber Bragg grating according to an exemplary embodiment of the invention, and FIG. 7 is a graph showing plots of maximum overlap integral values.

DETAILED DESCRIPTION OF THE PREFERRED EMBODIMENTS

Figure 1:
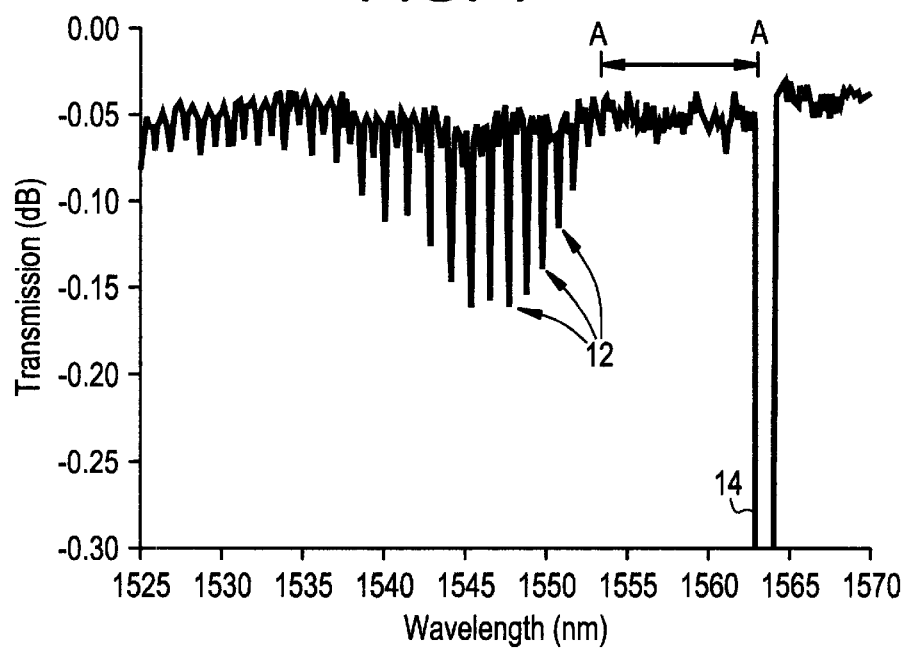
FIG. 1 is a graph of transmission vs. wavelength for a typical fiber Bragg grating.

Reference will now be made in detail to the present preferred embodiments of the invention, an example of which is illustrated in the accompanying drawings. Wherever possible, the same reference numbers will be used throughout the drawings to refer to the same or like parts. An exemplary embodiment of the optical waveguide fiber of the present invention is shown in FIG. 2, and is designated generally by reference numeral 10.

In accordance with the invention, the present invention for an optical waveguide fiber includes a photosensitive core 16 and a cladding 18. As embodied herein and depicted in FIG. 2, the core 16 includes a silica glass compound such as is commonly used in optical waveguide fiber cores, with the addition of Ge and B as dopants. In one embodiment, the Ge dopant is provided in the form of $GeO_2$. The amount of $GeO_2$ doped into the core 16 may be in the range from about 3% by weight to about 40% by weight, or more advantageously, from about 5% by weight to about 25% by weight.

In the exemplary embodiment, boron as a dopant is provided in the form of $B_2O_3$. The amount of $B_2O_3$ doped into the core 16 may be in the range from about 0% by weight to about 40% by weight or, more advantageously, from about 0% by weight to about 20% by weight. These weight percentages are percentages of total weight of the core, i.e., the effective average weight percentage over the core.

Figure 2:
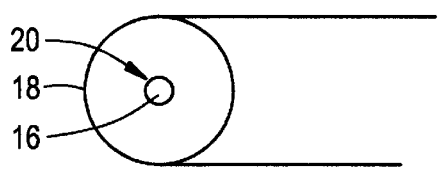
FIG. 2 is a perspective view of an optical fiber according to an exemplary embodiment of the present invention.

In the embodiment depicted in FIG. 2, the cladding 18 may be made of a silica glass compound as may be typically used for cladding in an optical waveguiding fiber. The cladding 18 includes an inner cladding region 20 in the area adjacent the core 16. The inner cladding region 20 further includes Ge and B as dopants. In the exemplary embodiment, Ge is provided in the form of $GeO_2$. The amount of $GeO_2$ doped into the inner cladding region 20 may be in the range of from about 1% by weight to about 30% by weight or, more advantageously, from about 5% by weight to about 20% by weight. In the exemplary embodiment, B is provided in the form of $B_2O_3$. The amount of $B_2O_3$ doped into the inner cladding region 20 may be in the range of from about 1% by weight to about 40% by weight. These weight percentages are percentages of the total weight of the doped portion of the cladding, i.e., the effective average weight percentage over the inner cladding region 20.

Figure 3:
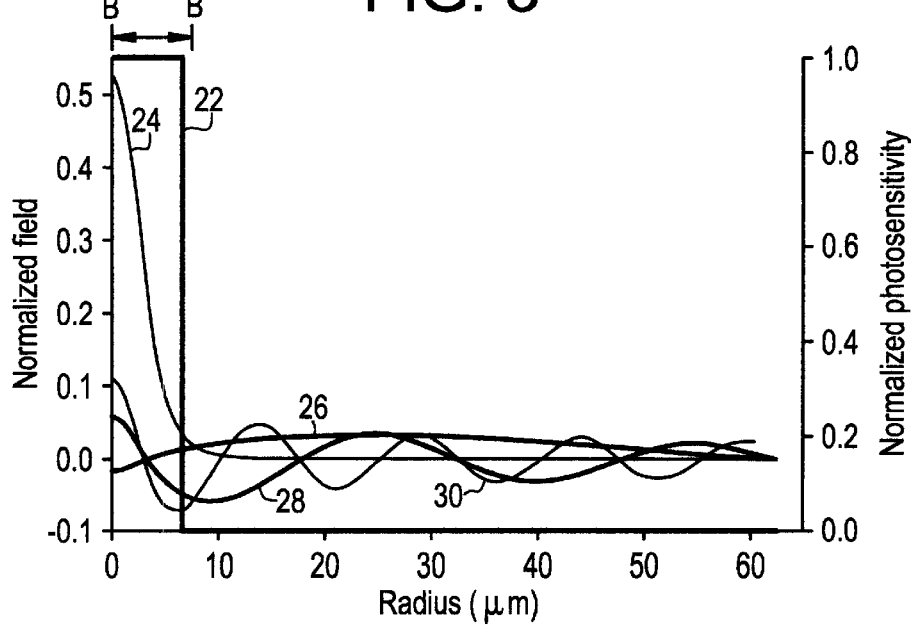
FIG. 3 is a graph showing modal field distribution and normalized index modulation as a function of radius for a fiber according to an exemplary embodiment of the invention.

FIG. 3 shows plots of both normalized index modulation and normalized field strength for various modes as function of fiber radius in a fiber according to an exemplary embodiment of the present invention. The curves shown in FIG. 3 are for a fiber having a core radius of about 3.3 $\mu$m, a photosensitive inner cladding region of about 3.3 $\mu$m in thickness, and an overall radius from center point to the outer edge of the cladding of about 62.5 $\mu$m. In the illustrated embodiment, normalized index modulation, shown by curve 22, is substantially constant from a radius of zero out to a radius of about 6.6 $\mu$m due to the addition of Ge and B dopants. Field distributions for the $LP_{01}$, $LP_2$, $LP_{05}$ and $LP_{09}$ modes are plotted as curves 24, 26, 28 and 30, respectively.

The likelihood of coupling between any two modes by a grating can be measured by an overlap integral I done over the cross section A of the fiber, given by the equation:

$$I = \int_A \Delta n(r,\phi) F_{01}(r,\phi) F_{nm}(r,\phi) r dr d\phi, \qquad (3)$$

where $F_{01}(r, \phi)$ is the field distribution of the $LP_{01}$ mode, $F_{nm}(r, \phi)$ is the field distribution of the $LP_{nm}$ mode, and $\Delta n(r, \phi)$ is the refractive index modulation that makes up the grating. Variables r and $\phi$ are the polar coordinates of the fiber cross section.

This overlap integral as well as grating strength and length determines the total coupling between two modes in a grating. If the grating were made constant over the fiber cross section, the overlap integral would equal zero for intermodal coupling, due to modal orthogonality. In a practical sense, however, the fundamental mode $LP_{01}$ has substantially non-zero power only in a region B—B extending from the center point to a radius much smaller than that of the entire fiber cladding (see FIG. 3). It is, therefore, sufficient to make the grating profile constant approximately over this center portion B—B of the fiber, which includes the core 16 and a small ring in the cladding next to the core. This ring in the cladding is the region referred to above as the inner cladding region 20.

There is an additional advantage of confining the grating to a small region in the center of the fiber. Typically, grating strength in the core is a key concern. Making the whole cladding photosensitive interferes with the writing of a grating in the core and center part of the cladding, and adversely affects grating strength in this center region within the fiber. Making the entire cladding photosensitive is equivalent to introducing loss to the whole cladding region for the writing UV light. If the entire cladding or a relatively large part of the cladding is made photosensitive, the writing UV light will be attenuated before it reaches the important center part of the fiber and therefore will not be able to write an efficient grating in the center part of the fiber. Extending the grating out to a small innermost region of the cladding provides cladding mode suppression while still allowing efficient writing of a grating of desired strength in the core. In the illustrated embodiment, the inner cladding region extends from the outer radius of the core, at a radius of approximately 3.3 µm, out to a radius of approximately 6.6 µm. An outer radius for the inner cladding region 20 of up to about five times the core radius has been found to be acceptable. An outer radius of up to about twice the core radius has been found preferable.

Grating strength is determined by achievable index modulation. Ge provided as a dopant in the inner cladding region 20 according to the invention raises the achievable index modulation of this region so that a grating written into the fiber by exposure to actinic radiation such as ultraviolet light will extend outward from the core 16 into the inner cladding region 20. FIG. 7 shows plots of maximum overlap integral values for achieving less than 0.1 dB cladding mode coupling loss for a 30 dB grating, a 40 dB grating and a 50 dB grating. As FIG. 7 shows, to achieve less than 0.1 dB cladding mode coupling loss for a 30 dB grating, index modulation of the inner cladding region should be within 20% of that of the core.

Ge alone, however, would make the refractive index of the inner cladding region 20 substantially different from that of the remainder of the cladding 18. To avoid this, the refractive index of the inner cladding region 20 is made to be about the same as, i.e., within a range of about –0.003 to 0.001 from, that of the rest of the cladding 18 by a combination of Ge and B doping. Ge doping increases the refractive index of silica, while boron doping reduces it. The Ge doping also provides photosensitivity. Photosensitivity increases as the level of Ge increases. Boron doping alone does not provide photosensitivity, but it can enhance the photosensitivity provided by Ge doping. The ternary glass used in typical optical fibers allows for independent adjustment of refractive index and photosensitivity by adjustment of Ge and B levels. B doping in the inner provides for the achievement of an index modulation in the inner clad, which is substantially equal to as that in core, due to the low Ge doping level in the inner clad. Alternatively, an appropriate amount of P doping can also be used to reduce photosensitivity in appropriate part of the fiber, e.g. the core, to achieve a substantially equal index modulation in the inner clad as that in core. In this case, as an alternative to B doping in inner cladding, the refractive index of the inner cladding region 20 can be made the same as that of the rest of the cladding 18 by a combination of Ge and F doping. For the core, a $P_2O_5$ concentration of from about 0.5% to about 20% by weight, and an F concentration of from about 0% to about 10% by weight has been found suitable. For the inner cladding region, $P_2O_5$ in a concentration of from about 0% to about 20% by weight, and F in a concentration of from about 0% to about 10% by weight has been found suitable.

Figure 4:
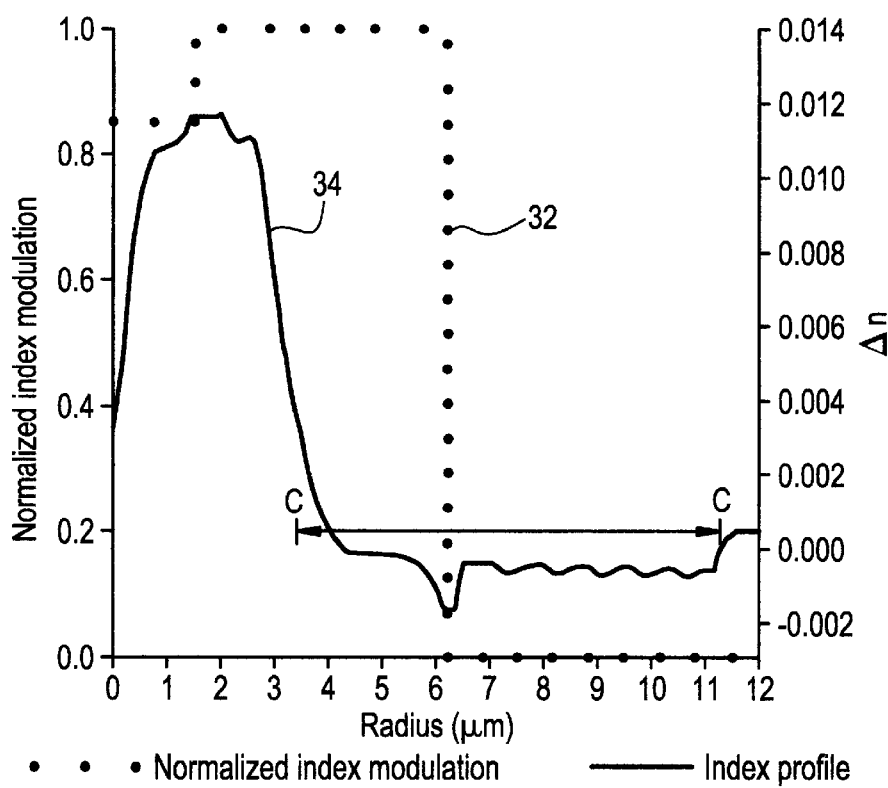
FIG. 4 is a graph showing normalized index modulation and refractive index as a function of radius for a fiber according to an exemplary embodiment of the invention.

In an exemplary embodiment, the core contains a higher level (relative to inner cladding) of Ge and lower level of B (relative to inner cladding), to increase its refractive index while providing photosensitivity, while the inner cladding region has a lower Ge level (relative to the core) but higher B (relative to the core) level to provide a refractive index similar to that of the silica making up the remainder of the cladding and at the same time an index modulation equal to that of the core. FIG. 4 shows a plot 32 of normalized index modulation as a function of radius, a refractive index profile 34 as a function of radius for the illustrated embodiment. As FIG. 4 shows, doping levels may be chosen so that the refractive index is substantially constant throughout the cladding, designated as region C—C in FIG. 4.

A two-stage process for determining desired dopant levels may be used. First, a series of fibers with systematic differences in Ge and B doping levels in compositions are made. A grating is then written in each fiber and the full cladding mode spectral distribution is measured. The modal field distributions for the fundamental mode and a large number of cladding modes (e.g., 100) are calculated from the measured fiber refractive index profile. The cladding mode strength for each cladding mode is then evaluated based on an assumed index modulation profile. The calculated cladding mode structure is then compared with the measured one. A new index modulation profile is then assumed based on the resulting discrepancies, until a good estimated photosensitive profile is obtained. A double step index modulation profile, one for core and one for cladding, is found to be adequate for most fibers. This is equivalent to taking effective step index modulation in core and cladding. The data collected during this first stage may not be sufficient to give a final optimized design, but does provide a good approximation. In the second step, the cladding composition is fixed and the core composition is finely tuned to achieve the desired photosensitive profile. FIG. 6 shows the cladding mode measurement for a fiber optimized for with a cladding mode coupling loss of 0.1 dB for a 30 dB Bragg grating.

A fiber according to the present invention may be fabricated by any known fiber fabrication methods. MCDV methods, with certain modifications have been found a suitable fabrication process. Preferably, the Ge and B dopants are incorporated independently rather than simultaneously, and deposition and sintering are done as separate steps, and at different temperatures. This process is described in U.S. patent application Ser. No. 09/399,291, entitled Method for Creating Codoped Layers and Fibers Containing Codoped Layers, filed on Sep. 17, 1999, (inventors: Gang Qi and Martin L. Swan; Attorney Case Name No. Qi 3-2) which is hereby incorporated by reference in its entirety.

EXAMPLE

The invention will be further clarified by the following example, which is intended to be exemplary of the invention.

Figure 5:
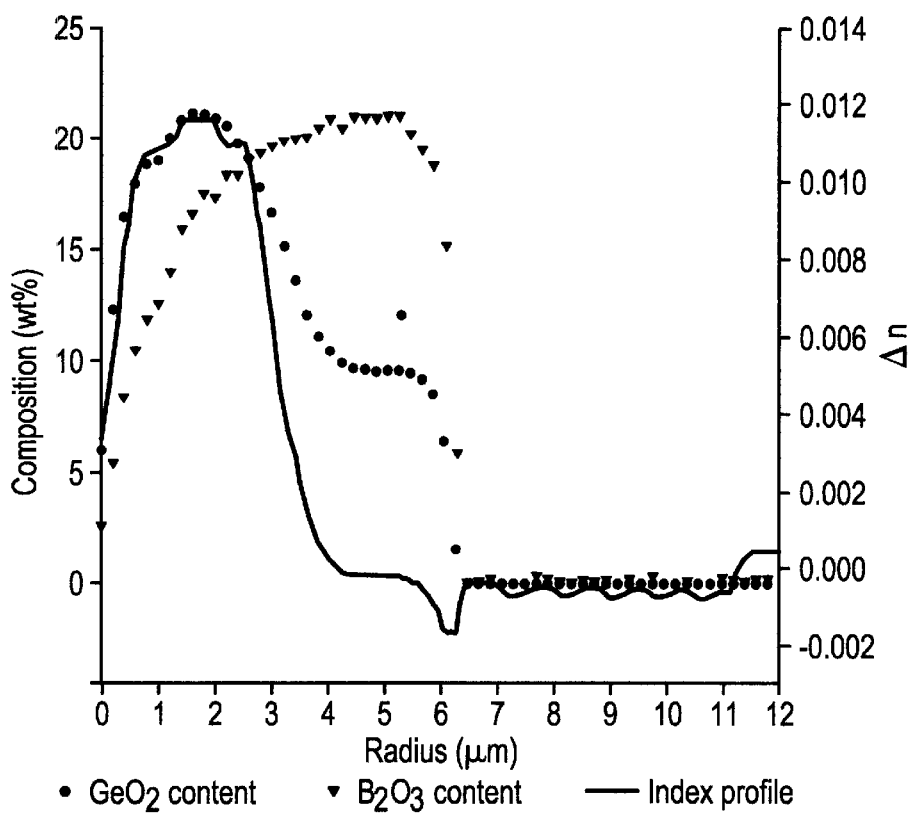
FIG. 5 is a graph of composition in weight percent vs. radius for a fiber according to an exemplary embodiment of the invention.

A fiber was fabricated. The refractive index of the photosensitive cladding was made to be about the same as that of the rest of the cladding by using a combination of germanium and boron doping. Levels of Ge and B doping as a function of radius are shown in FIG. 5, and given in the following Table:

| Radius (µm) | $SiO_2$ (wt. %) | $GeO_2$ (wt. %) | $B_2O_3$ (wt. %) |
| --- | --- | --- | --- |
| 0.00 | 91.44 | 5.99 | 2.57 |
| 0.20 | 82.35 | 12.25 | 5.39 |
| 0.41 | 75.18 | 16.42 | 8.39 |
| 0.61 | 71.53 | 17.97 | 10.50 |
| 0.82 | 69.32 | 18.81 | 11.87 |
| 1.02 | 68.43 | 18.99 | 12.58 |
| 1.22 | 65.93 | 20.04 | 14.02 |
| 1.43 | 63.22 | 20.82 | 15.96 |
| 1.63 | 62.34 | 21.06 | 16.60 |
| 1.84 | 61.48 | 21.02 | 17.50 |
| 2.04 | 61.76 | 20.89 | 17.35 |
| 2.24 | 61.00 | 20.57 | 18.40 |

| Radius (μm) | SiO₂ (wt. %) | GeO₂ (wt. %) | B₂O₃ (wt. %) |
|---|---|---|---|
| 2.45 | 61.78 | 19.79 | 18.41 |
| 2.65 | 61.95 | 19.12 | 18.93 |
| 2.86 | 62.79 | 17.83 | 19.37 |
| 3.06 | 63.64 | 16.67 | 19.69 |
| 3.26 | 64.90 | 15.17 | 19.93 |
| 3.47 | 66.33 | 13.64 | 20.03 |
| 3.67 | 67.88 | 12.04 | 20.06 |
| 3.88 | 68.38 | 11.10 | 20.49 |
| 4.08 | 68.64 | 10.45 | 20.90 |
| 4.28 | 69.56 | 9.90 | 20.52 |
| 4.49 | 69.30 | 9.67 | 21.01 |
| 4.69 | 69.39 | 9.63 | 20.97 |
| 4.90 | 69.51 | 9.54 | 20.95 |
| 5.10 | 69.35 | 9.58 | 21.07 |
| 5.30 | 69.29 | 9.58 | 21.08 |
| 5.51 | 70.21 | 9.47 | 20.28 |
| 5.71 | 71.25 | 9.18 | 19.51 |
| 5.92 | 72.57 | 8.53 | 18.81 |
| 6.12 | 78.24 | 6.44 | 15.20 |
| 6.32 | 92.18 | 1.56 | 5.94 |
| 6.53 | 99.29 | 0.01 | 0.10 |
| 6.73 | 98.93 | 0.00 | 0.15 |
| 6.94 | 98.55 | 0.00 | 0.26 |
| 7.14 | 98.62 | 0.00 | 0.00 |
| 7.34 | 99.31 | 0.00 | 0.00 |
| 7.55 | 99.30 | 0.00 | 0.00 |
| 7.75 | 98.64 | 0.00 | 0.38 |
| 7.96 | 98.40 | 0.00 | 0.27 |
| 8.16 | 98.75 | 0.00 | 0.14 |
| 8.36 | 99.32 | 0.00 | 0.09 |
| 8.57 | 98.87 | 0.00 | 0.21 |
| 8.77 | 98.57 | 0.00 | 0.15 |
| 8.98 | 98.90 | 0.00 | 0.24 |
| 9.18 | 99.44 | 0.00 | 0.00 |
| 9.38 | 98.77 | 0.00 | 0.29 |
| 9.59 | 98.63 | 0.00 | 0.04 |
| 9.79 | 98.82 | 0.00 | 0.37 |
| 10.00 | 99.34 | 0.00 | 0.00 |
| 10.20 | 98.86 | 0.00 | 0.05 |
| 10.40 | 98.52 | 0.00 | 0.19 |
| 10.61 | 99.40 | 0.00 | 0.00 |
| 10.81 | 98.99 | 0.00 | 0.04 |
| 11.02 | 98.67 | 0.00 | 0.35 |
| 11.22 | 99.30 | 0.00 | 0.23 |
| 11.42 | 99.75 | 0.00 | 0.19 |
| 11.63 | 99.71 | 0.00 | 0.28 |
| 11.83 | 99.72 | 0.00 | 0.27 |
| 12.04 | 99.63 | 0.00 | 0.37 |
| 12.24 | 99.71 | 0.00 | 0.29 |
| 12.44 | 99.67 | 0.00 | 0.32 |
| 12.65 | 99.86 | 0.00 | 0.13 |
| 12.85 | 99.92 | 0.00 | 0.08 |
| 13.06 | 99.89 | 0.00 | 0.11 |
| 13.26 | 99.55 | 0.00 | 0.45 |
| 13.46 | 99.85 | 0.00 | 0.15 |
| 13.67 | 99.72 | 0.00 | 0.28 |
| 13.87 | 99.71 | 0.00 | 0.29 |
| 14.08 | 99.71 | 0.00 | 0.29 |
| 14.28 | 99.88 | 0.00 | 0.12 |
| 16.32 | 99.72 | 0.00 | 0.28 |
| 18.36 | 99.62 | 0.00 | 0.38 |
| 20.40 | 100.00 | 0.00 | 0.00 |
| 22.44 | 99.85 | 0.00 | 0.15 |
| 24.48 | 99.77 | 0.00 | 0.23 |
| 26.52 | 99.93 | 0.00 | 0.07 |
| 28.56 | 99.75 | 0.00 | 0.25 |
| 30.60 | 99.96 | 0.00 | 0.03 |
| 32.64 | 99.99 | 0.00 | 0.01 |
| 34.68 | 99.94 | 0.00 | 0.06 |
| 36.72 | 99.82 | 0.00 | 0.18 |
| 38.76 | 99.72 | 0.00 | 0.28 |
| 40.80 | 99.94 | 0.00 | 0.05 |
| 42.84 | 99.88 | 0.00 | 0.12 |
| 44.88 | 99.91 | 0.00 | 0.09 |
| 46.92 | 99.76 | 0.00 | 0.24 |
| 48.96 | 99.94 | 0.00 | 0.06 |
| 51.00 | 99.73 | 0.00 | 0.27 |

The invention provides a way to achieve cladding mode coupling loss under 0.1 dB for 30 dB gratings in different fibers, including both hydrogenated and non-hydrogenated fibers. The fiber according to the invention also may be optimized for splicing with a low average splice loss of 0.03 dB to commonly used optical fibers such as the SMF-28™ fiber available from Corning Incorporated.

It will be apparent to those skilled in the art that various modifications and variations can be made to the present invention without departing from the spirit and scope of the invention. Thus, it is intended that the present invention covers the modifications and variations of this invention provided they come within the scope of the appended claims and their equivalents.

What is claimed is:

1. An optical waveguiding fiber comprising:
    a photosensitive core doped with Ge;
    a cladding including a photosensitive inner cladding region doped with Ge adjacent said core, and an outer cladding region,
    the inner cladding region and the outer cladding region having substantially equal indices of refraction,
    at least one of the core and the inner cladding region including at least one additional dopant in combination with the Ge dopant, and the concentrations of Ge in the core, Ge in the inner cladding region and the additional dopant being such that after the fiber is exposed to ultraviolet light, the index modulation of the inner cladding region is within about 50 percent of the index modulation of the core caused by said exposure.

2. The fiber of claim 1, wherein the inner cladding region has an outer radius which is less than about five times the radius of said core.

3. The fiber of claim 2 wherein the index modulation of the inner cladding region is within about 25 percent of the index modulation of the core.

4. The fiber of claim 3 wherein the index modulations in the core and in inner cladding region caused by exposure to ultraviolet light are substantially equal.

5. The fiber of claim 1, 2, 3 or 4 wherein at least one additional dopant includes B doped into said inner cladding region.

6. The fiber of claim 5 wherein the concentrations of said Ge and B dopants are sufficient to impart photosensitivity to the inner cladding region, and to result in a difference between the index of refraction in the inner cladding region and the index of refraction of the outer cladding region within a range of about −0.003 to about 0.00 1.

7. The fiber of claim 6 wherein said core includes Ge and B as dopants.

8. The fiber of claim 7 wherein
    the core includes $GeO_2$ in a concentration of from about 3% to about 40% by weight, and $B_2O_3$ in a concentration of from about 0% to about 40% by weight, and
    the inner cladding region includes $GeO_2$ in a concentration of from about 1% to about 30% by weight, and $B_2O_3$ in a concentration of from about 5.8% to about 40% by weight.

9. The fiber of claim 8 wherein:

the core includes $GeO_2$ in a concentration of from about 5% to about 25% by weight, and $B_2O_3$ in a concentration of from about 0% to about 20% by weight, and the inner cladding region includes $GeO_2$ in a concentration of from about 5% to about 20% by weight, and $B_2O_3$ in a concentration of from about 10% to about 30% by weight.

10. The fiber of claim 1, 2, 3, or 4 wherein the core includes $GeO_2$ in a concentration of from about 3% to about 40% by weight, $P_2O_5$ in a concentration of from about 0.5% to about 20% by weight, F in a concentration of from about 0% to about 10% by weight and $B_2O_3$ in a concentration of from 0% to about 40% by weight, and the inner cladding region includes $GeO_2$ in a concentration of from about 1% to about 30% by weight, $P_2O_5$ in a concentration of from about 0% to about 20% by weight, F in a concentration of from about 0% to about 10% by weight and $B_2O_3$ in a concentration of from about 0% to about 40% by weight.

11. The fiber of claim 10 wherein:

the core includes $GeO_2$ in a concentration of from about 3% to about 30% by weight, $P_2O_5$ in a concentration of from about 0.5% to about 10% by weight, F in a concentration of from about 0% to about 5% by weight and $B_2O_3$ in a concentration of from 0% to about 5% by weight, and the inner cladding region includes $GeO_2$ in a concentration of from about 1% to about 30% by weight, $P_2O_5$ in a concentration of from about 0% to about 10% by weight, F in a concentration of from about 1% to about 5% by weight and $B_2O_3$ in a concentration of from about 0% to about 10% by weight.

* * * * *